(12) United States Patent
Westing et al.

(10) Patent No.: US 10,610,027 B2
(45) Date of Patent: Apr. 7, 2020

(54) INLINE METHOD FOR PRODUCING A SPRING STRIP PROFILE FOR A SLATTED FRAME

(71) Applicant: OKE GROUP GmbH, Hoerstel (DE)

(72) Inventors: Kerstin Westing, Georgsmarienhuette (DE); Andreas Bartel, Hoerstel (DE); Florian Plagemann, Hoerstel (DE)

(73) Assignee: OKE GROUP GMBH, Hoerstel (DE)

( * ) Notice: Subject to any disclaimer, the term of this patent is extended or adjusted under 35 U.S.C. 154(b) by 96 days.

(21) Appl. No.: 15/767,455

(22) PCT Filed: Sep. 28, 2016

(86) PCT No.: PCT/DE2016/100452
§ 371 (c)(1),
(2) Date: Apr. 11, 2018

(87) PCT Pub. No.: WO2017/063635
PCT Pub. Date: Apr. 20, 2017

(65) Prior Publication Data
US 2018/0289173 A1    Oct. 11, 2018

(30) Foreign Application Priority Data
Oct. 13, 2015   (DE) ......................... 10 2015 117 434

(51) Int. Cl.
*A47C 23/06* (2006.01)
*B29C 48/30* (2019.01)
(Continued)

(52) U.S. Cl.
CPC .......... *A47C 23/061* (2013.01); *B29C 48/154* (2019.02); *B29C 48/156* (2019.02);
(Continued)

(58) Field of Classification Search
CPC ... B29C 53/825; B29C 53/821; B29C 53/822; B29C 53/823; B29C 48/79; B29C 70/521; B29C 53/60
See application file for complete search history.

(56) References Cited

U.S. PATENT DOCUMENTS

| | | |
|---|---|---|
| 2005/0008804 A1 | 1/2005 | Davies et al. |
| 2007/0125310 A1* | 6/2007 | Oberstadt ............ A01K 13/001 119/601 |

(Continued)

FOREIGN PATENT DOCUMENTS

| | | |
|---|---|---|
| CN | 102332339 A | 1/2012 |
| DE | 10014376 A1 | 7/2001 |

(Continued)

OTHER PUBLICATIONS

Machine translation for FR2715280.*

(Continued)

*Primary Examiner* — Christopher T Schatz
(74) *Attorney, Agent, or Firm* — Jason H. Vick; Sheridan Ross, PC

(57) ABSTRACT

An inline method for producing a spring strip profile (1) for a slatted frame that comprises at least one core strand (2) formed by a fiber-reinforced plastic and at least one thermoplastic cover layer (3) surrounding the core strand (2), comprises at least the following steps: joining multiple fibers, threads and/or filaments to form a fiber bundle (2.1); impregnating the fiber bundle (2.1) with a thermally activatable reaction resin; molding the outer contour of the fiber bundle (2.1) impregnated with the reaction resin; thermally activating the reaction resin (2.1) to form a cured core strand; introducing the core strand (2) into an extruder head (110); applying thermoplastic melt in the extruder head (110) to form the cover layer (3) on the spring strip profile (1); and cooling and calibrating the spring strip profile (1) in (Continued)

a cooling and calibrating device (111, 112, 113). The outer contour of the fiber bundle (2.1) is wrapped around, in a winding machine (105), by at least one thread or filament (2.2) supplied laterally in relation to the fiber bundle in at least one position and orientation, and, in a heating section (106), before the core strand (2) is introduced into the extruder head (110), at least a partial curing of the reaction resin is achieved, at least in the wrapped outer layer of the fiber bundle (2.1).

10 Claims, 2 Drawing Sheets

(51) Int. Cl.
    *B29C 48/34* (2019.01)
    *B29C 48/79* (2019.01)
    *B29C 48/154* (2019.01)
    *B29C 48/156* (2019.01)
    *B29C 70/52* (2006.01)
    *B29C 48/06* (2019.01)
    *B29C 48/12* (2019.01)
    *B29C 48/285* (2019.01)
    *B29C 35/02* (2006.01)
    *B29C 53/60* (2006.01)

(52) U.S. Cl.
    CPC .............. *B29C 48/30* (2019.02); *B29C 48/34* (2019.02); *B29C 48/79* (2019.02); *B29C 70/521* (2013.01); *B29C 35/02* (2013.01); *B29C 48/06* (2019.02); *B29C 48/12* (2019.02); *B29C 48/2883* (2019.02); *B29C 53/60* (2013.01)

(56) References Cited

U.S. PATENT DOCUMENTS

2011/0308709 A1* 12/2011 Ouellette ............ B29C 35/0266
                                                          156/172
2014/0265043 A1*  9/2014 Oldroyd ................ B29C 41/085
                                                          264/482

FOREIGN PATENT DOCUMENTS

| DE | 10251518 A1 | 5/2004 |
| EP | 1063081 A2 | 12/2000 |
| EP | 2865296 A1 | 4/2015 |
| FR | 2715280 A1 | 7/1995 |
| JP | H09-76357 A | 3/1997 |
| WO | 200222381 A1 | 3/2002 |
| WO | 2007025288 A1 | 3/2007 |

OTHER PUBLICATIONS

Machine translation for JP H0976357.*
International Search Report of Corresponding International Application No. PCT/DE2016/100452, Filed Sep. 28, 2016.
Written Opinion for corresponding International Application No. PCT/DE2016/100452, filed dated Feb. 3, 2017.
International Preliminary Report on Patentability for corresponding International Application No. PCT/DE2016/100452, filed dated Apr. 26, 2018.

* cited by examiner

US 10,610,027 B2

INLINE METHOD FOR PRODUCING A SPRING STRIP PROFILE FOR A SLATTED FRAME

CROSS REFERENCE TO RELATED APPLICATIONS

This application is a national stage application under 35 U.S.C. 371 of PCT Application No. PCT/DE2016/100452 having an international filing date of 28 Sep. 2016, which designated the United States, which PCT application claimed the benefit of German Application No. 10 2015 117 434.0, filed 13 Oct. 2015, each of which are incorporated herein by reference in their entirety.

BACKGROUND OF THE INVENTION

The invention relates to an inline method for producing a spring strip profile for a slatted frame which comprises at least one core strand formed by a fiber-reinforced plastic and at least one thermoplastic cover layer surrounding the core strand. The method comprises at least the following steps: joining multiple fibers, threads and/or filaments to form a fiber bundle; impregnating the fiber bundle with a thermally activatable reaction resin; molding the outer contour of the fiber bundle impregnated with the reaction resin; thermally activating the reaction resin to form a cured core strand; introducing the core strand into an extruder head; applying thermoplastic melt in the extruder head to form the cover layer on the spring strip profile; and cooling and calibrating the spring strip profile in a cooling and calibrating device.

EP 2 865 296 A1 shows various profile shapes for a spring strip profile, which comprises a core strand made of a fiber-reinforced plastic, in particular a glass-fiber-reinforced plastic, and a thermoplastic cover layer as a sheath. The advantage of such a spring strip profile over the spring strips made of wood usually used to form slatted frames is mainly that no pre-bending of the strip, a so-called segmental arch is required. In fact, with the composite profile, the same carrying capacities and a consistent, permanent elasticity can be achieved with a straight profile section, which can be cut to any length and is easier to handle and storable than curved spring strips. The production of such a composite profile is usually carried out by having the core strand produced first and stored on rolls, until it is unwound again and coated by extrusion with the thermoplastic cover layer. Interim storage is required because the throughput speeds in the so-called "pultrusion" process used to make the core rod are many times lower than the take-off speed during the extrusion. The winding of a glass fiber-reinforced core rod requires considerable forces and is no longer possible beginning at a certain cross-sectional diameter of the core rod. Also, the later use of the tensioned winding roll in the extrusion line poses safety risks should the core profile bar that is under high bending stress break. A solid cross-section for the core profile is essential because a tubular structure buckles and breaks during winding. However, particularly the necessary interim storage of the prefabricated core profile bar on rolls leads to a significant loss of time, which entails economic disadvantages in the production of the spring strip.

Known from FR 2 715 280 is a generic inline method for forming a spring strip from a composite profile, which avoids the disadvantages associated with the interim storage. Here, a spring strip is produced in a single operational step by initially forming the glass-fiber-reinforced core strand using an in principle also known pultrusion method and then directly following, in the same production line, extruding the thermoplastic cover layer onto it. The slatted profile finished completely inline can be cut to the required length and packed at the end of the production line. The disadvantage of this known inline method for producing a spring strip profile is that the throughput speed through the pultrusion process is very slow, i.e., the theoretically possible throughput speeds in the downstream extrusion cannot be utilized, because a certain residence time of the glass-fiber bundle impregnated with a reaction resin in the pultrusion tool is required to effect sufficient curing. If curing has not progressed sufficiently, the cross-section of the core profile bar is changed by the pressure of the thermoplastic melt or the structure of the core profile is even destroyed during the subsequent extrusion. A higher heat input per unit of time can also not be achieved with the known method by arbitrarily extending the heated pultrusion tool because the frictional forces in the tool would then no longer be handled with a reasonable expenditure.

SUMMARY OF THE INVENTION

The problem addressed by the present invention is, therefore, to improve an inline method for producing a spring profile strip for forming a slatted frame such that, in particular, a significantly higher throughput speed is achieved with the inline method and furthermore to effect a more economical manufacturing method.

This objective, as well as other objectives which will become apparent from the discussion that follows is achieved, according to the present invention, by a method wherein, in a winding machine, the outer contour of the fiber bundle is wrapped around by at least one thread or filament supplied laterally in relation to the fiber bundle in at least one position and orientation, and wherein, in a heating section, before the core strand is introduced into the extruder head, at least a partial curing of the reaction resin is achieved, at least in the wrapped outer layer of the fiber bundle.

Essential to the invention is that complete curing of the thermoset core profile is not required before the extrusion of the thermoplastic is carried out, but rather that post-curing of the core strand can also take place after the extrusion of the cover layer, namely up to the storage time of the profile bars that are already finished on the outside and packed. The reaction heat that results when a suitable reaction mixture is used, which leads to an exothermic crosslinking reaction during the polyester formation, is utilized for this purpose. In addition, the already applied thermoplastic cover layer acts as a heat insulator, so that the heat generated by the exothermic reaction in the reaction resin is not dissipated to the surrounding area but contributes to faster curing from the inside out.

In addition to the use as a spring strip profile for a slatted bed base, the profile thus produced can also be used for the upholstery support of seating furniture, as well as for completely different applications in which a high mechanical strength and a closed thermoplastic outer skin are desirable.

However, in order to enable such post-curing after leaving the production system, it is necessary to stabilize the core strand until it enters the extrusion die beforehand in such a way that it is possible to extrude the cover layer without changing the cross-section of the core profile strand, even if a complete cure has not yet occurred.

To effect such partial curing in a sufficient manner, but at the same time achieve significantly higher throughput speeds than in the prior art, the fiber bundle, which is prepared for the formation of the core strand, is according to the invention stabilized by at least one spiral wrapping with laterally supplied additional fibers, threads or filaments and to keep the resin-wetted, longitudinally extending fibers during curing very close to each other.

Preferably, a helical area is kept free between the wrappings in the wrapped fiber bundles. The winding compresses the fibers so that more resin settles in the non-wrapped area.

It is also possible to provide a winding of at least two spiral-shaped windings running counter to each other.

A high strength of the core strand already exists when the resin has cured only in the wrappings and the outer fiber layers.

By wrapping, a fiber composite plastic with a matrix of the longitudinally extending fibers of the fiber bundle and the almost transverse thereto extending fibers, in particular polyamide fibers, is formed from the wrap when curing the reaction resin on the outside of the fiber bundle. This results in a stable cover structure on the outside of the core strand by supplying heat, even if it is initially cured only in the outer regions of the cross-section. The partially cured core strand is stable enough after reaching the maximum temperature peak to be guided through the extrusion die and not to change its cross-sectional shape when the cover layer is extruded. This makes it possible, as already demonstrated, to go into the extrusion with a core strand that has been cured only in marginal areas and to postpone complete curing of the thermoset cross-section in the core strand to the storage and transport time of the spring strip profile.

With the inline method according to the invention, throughput times of 4 m/min and more can be achieved, whereas throughput times in conventional pultrusion processes are in the range of 0.1 to max. 1.5 m/min.

Preferably, a heating path is provided, formed with a sufficient length so that at the given geometric dimensions of the cross-section of a flow rate of 3 m/min to 9 m/min, which depends on the diameter, an almost complete curing of the core strand is already achieved. A 25% or greater increase in the throughput speed is easily possible according to the invention, because the stability of the outer region of the core strand is sufficient until the entry into the extrusion, and complete curing can be effected by the described post-curing processes.

It has been shown that due to the already described strength of the cross-linked fibers in the outer region, a full cross-section of the core strand is no longer required in each and every case. It is, therefore, preferable to guide the fiber bundle for the longitudinal fibers over a mandrel and thereby form a tubular core strand that is hollow in the center. Since the layer thickness to be cured is thus significantly reduced compared to a solid cross-section, the reaction time in the core strand can be reduced again.

The outer contour of the core strand may be circular or polygonal, but should be rotationally symmetric, so that the pressure forces originating from the melt in the extruder head act relatively evenly on the outer contour of the core strand.

When using a mandrel and forming a tubular core strand, it is also advantageous if the mandrel is heated from the inside. This also makes it possible to accelerate the curing of the core strand from the inside out, which in turn leads to the ability to increase the throughput speed since it is possible to use time reserves through the post-curing processes during storage and transportation.

Instead of a mandrel, a thermoplastic core can be used that does not generate any frictional forces as it moves along. This core can be made of plastics that are temperature resistant up to 200° C. An opening of the core is also possible, for which a plastic pipe or tube is used. Even foamed material can be used as a core.

Preferably, a cover layer is formed by extrusion, which is symmetrical with respect to both a horizontal and a vertical cross-sectional axis. As a result, one-sided material accumulations are avoided in the cross-section, so that deformation of the spring strip profile is avoided during the subsequent cooling. This is particularly advantageous in view of the option of effecting post-curing only after leaving the extrusion line.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
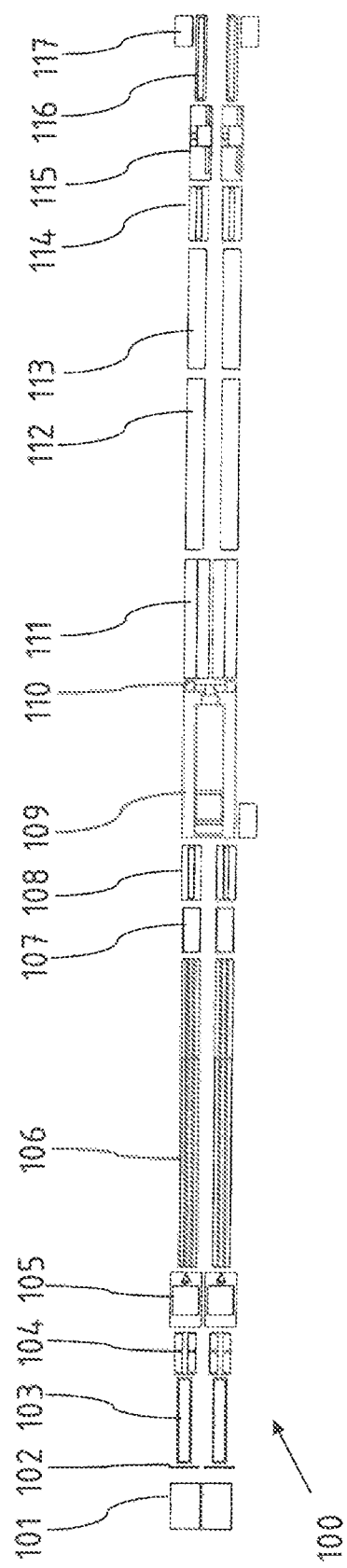
FIG. 1 is a production device for carrying out the inline method in a schematic view from above.

The preferred embodiments of the present invention will now be described with reference to FIGS. 1-4 of the drawings. Identical elements in the various figures are designated with the same reference numerals.

The method according to the invention is explained below with reference to the production system 100 shown in a schematic block view from above in FIG. 1, in which the production direction runs from left to right.

In the exemplary embodiment, the schematically illustrated production system 100 is designed as a duo production system, i.e., two almost identical production lines run parallel next to each other, wherein in the illustrated embodiment, most components, except for an extruder 109, are present separately for each line, that is, double. The entire length of the production line from beginning to end is 40 m in the example shown.

Multiple bobbins are kept ready on a creel 101 so that fibers or threads or filaments wound thereon from a plurality of individual fibers can be drawn off through a fiber gate 102. The individual fibers, threads or filaments are drawn through an impregnation bath 103, in which a liquid reaction resin is kept on hand. This is a polyester resin that contains a polyol component and a hardener additive and must be thermally activated. As long as the ambient temperature of the production system 100 does not rise too high, the resin remains permanently liquid in the impregnation bath 103.

Figure 3:
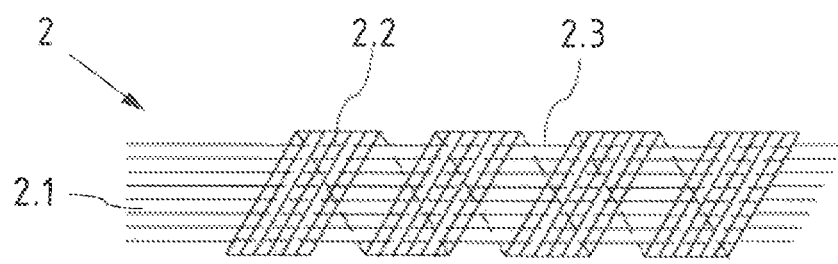
FIG. 3 is a core strand before the formation of the cover layer.

At an intermediate station 104, the fibers are guided so that they can be directionally inserted into a winding machine 105. As shown in FIG. 3, the longitudinal fibers of a fiber bundle running in the direction of production are wrapped at the winding machine 105 by laterally fed transverse fibers.

This produces a spiral wrap 2.2, which leaves intermediate sections 2.3 free of the wrapping. The thus prepared fiber strand 2 that is impregnated with reactive resin is heated in a heating path 106, wherein a low heating temperature is provided directly at the inlet into the heating path 106, to initiate the chemical reaction of the reaction resin, which leads to curing. A so-called "pre-former" can be used to strip off excess resin that is returned to the process. In the following course of the heating path 106, the temperature is maintained at a higher level to continue the initiated chemical reaction.

As can already be seen from the production system drawn only schematically in FIG. 1, the heating path 106 is designed to be relatively long in relation to the other components of the production system 100; with about 11 m of the 45 m production line, it thus takes 20% of the path, so that one fifth of the throughput time is allotted to the heating path 106. At a take-off speed of 5 m/min, about 100 seconds are available to initiate the polyester reaction and to promote it sufficiently so that curing of the near-edge of the outer layer is effectuated.

The curing fiber strand 2 is guided through in the heating path 106 largely free of contact, possibly supported on some support rollers, so that contrary to the pultrusion no high take-off forces are required.

The take-off of the individual fibers from the fiber gate through the impregnation tank 103 and the winding machine 105 is effected by a take-off device 108.

To avoid excessive adhesion of the take-off device 108 by premature curing of the reaction resin and/or softening of plastic parts in the take-off device 108, the core strand 2 is cooled in a bar cooling device 107 briefly and primarily on the surface. Since the curing reaction that is still in progress on the inside is exothermic and curing of the peripheral regions of the core profile strand 2, including its wrapping, has already taken place, curing continues on the inside despite the cooling on the surface.

In addition to the cooling to slow down the reaction on the surface, the reversed path is possible by hot air being supplied to support and accelerate curing. Subsequently, the core strand 2 runs in an extrusion die, which is mounted on a double angle head 110 of an extruder 109 common to both lines. In the manner customary in profile extrusion, the spring strip profile then passes through a calibrating tank 111 to post-shape the outer contour of the cover layer 3 of the extruder and to support it during solidification, and is then cooled in a cooling basin 112, 113 so far that the thermoplastic melt in the cover layer is dimensionally stable.

Withdrawing of the wrapped spring strip profile 1 is carried out via a second take-off device 114, via which the externally finished, albeit internally not cured, spring strip profile 1 is supplied to a cutting system 115. The take-off speed at the second take-off device 114 is synchronized with the one at the first take-off device 108.

The spring strip profile is cut to length in the cutting unit 115, in particular by a follower sawing device to form individual spring strip rods, from which a slatted frame for supporting a mattress or a cushion can be formed. The spring strip rods are packaged in a packing device 116 such that they are parallel to each other in the longitudinal direction and on top of each other, but that no bending forces are caused by crosswise or oblique stacking.

In this way, the core layer, to the extent that it is not completely cured at the end of the production system 100, continues to cure during the subsequent storage period. The once initiated reaction is exothermic due to the nature of the polyester reaction resin used and can therefore take place without additional heat input from outside as long as reactants are present in the correct ratio to form a polyester plastic.

The spring strip rods are advantageously stacked at the packaging device 116 in a box 117 or another container that is closed on the sides and at the bottom. The heat still contained in the bars is thereby preserved and facilitates the complete curing of the core strand in the storage location.

Figure 2:
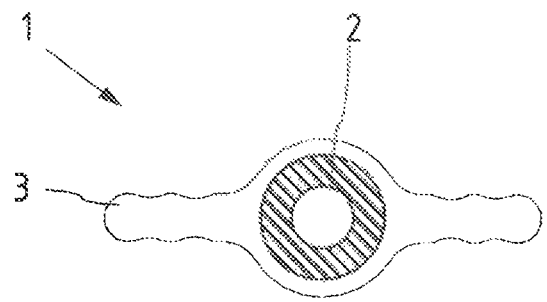
FIG. 2 is a cross-section through a spring strip profile.

The result is the spring link profile 1 shown in FIG. 2 in cross-section together with a core strand 2 and a cover layer 3. The core strand 2 is preferably designed as a circular tube, so that even faster curing can occur toward the inside due to the reduced wall thickness. With different wall thicknesses on the core strand, it is possible to set different properties at a bend, so that corresponding "hard" and "soft" spring strips can be formed. For example, the outer diameter of the core strand is 10 mm, and the wall thickness is 3 mm.

The thermoplastic cover layer, which consists of polypropylene, for example, surrounds the core strand 2 at the top and bottom with a uniform wall thickness. For the exemplary geometry mentioned, the thickness of the thermoplastic cover layer is approximately 1.5 mm there, wherein the cover layer serves exclusively as a handling and wear protection, however, it has no significant influence on the mechanical strength, which is determined almost exclusively by the dimension and cross-section of the core strand.

The cover layer profile protrudes on both sides in an extension toward the outside. The lateral extensions create a wide support surface at the top and bottom, which can support, for example, a cushion or a mattress. There is both a mirror symmetry of the profile cross-section with regard to a horizontal axis as well as with regard to a vertical axis. As a result, one-sided warping is avoided during the cooling process, since equal volumes of thermoplastic melt are introduced on both sides, which are subjected to the same cooling conditions on all sides in the cooling and calibration devices 111, 112, 113.

Figure 4:
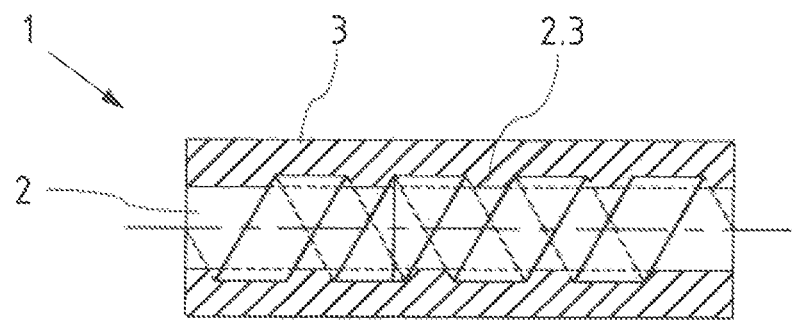
FIG. 4 is a longitudinal section through the spring strip profile.

Finally, FIG. 4 shows a longitudinal section through the finished spring strip profile 1. Interlocking of the outer cover layer 3 with the core profile 2 can be recognized there. The sections 2.3 that are still lying freely between the respective wrapping strands of the wrapped core strand 2 in FIG. 3 are filled with the thermoplastic material of the cover layer 3. This results in a secure connection between the thermoplastic cover layer and the core strand 2, which in particular prevents the two components 2, 3 to separate during cooling due to different shrinkage behavior. The extruded cover layer 3 even shrinks onto the rod. The profile bars obtained at the end of the production system 100 remain thus dimensionally stable after being cut to length, although the curing process inside the core strand 2 may not have been completed. Due to the positive interlocking of the cover layer 3 with the core strand 2, a subsequent change in shape is prevented during the remainder of the curing process during storage or transport.

It should also be emphasized that in the inline method according to the invention, the singly-wrapped fiber strand 2 shown in FIG. 3 is already formed sufficiently strong, in its raw state, without any impregnation, that it can be handled without further accessories. It is stable against buckling. Small differences in the take-off speeds of the take-off devices 108 and 114 can easily be compensated. Due to the dimensional stability of the core strand 2 that is in the process of curing can also be drawn over a very long heating path 106, so that at least the edge layers of the core strand 2 are cured at the inlet to the extruder head 110 and can readily withstand the melt pressure. If necessary, a second wrapping may be provided, which runs crosswise to the first wrapping.

There has thus been shown and described a novel method for producing a spring strip profile for a slatted frame which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An inline method for producing a spring strip profile for a slatted frame, wherein the spring strip profile comprises at least one core strand of a fiber-reinforced plastic and at least one thermoplastic cover layer surrounding the core strand, said method comprising:
   combining a plurality of fibers, threads and/or filaments into a fiber bundle;
   impregnating the fiber bundle with a thermally activatable reaction resin;
   shaping an outer contour of the fiber bundle impregnated with the reaction resin;
   thermally activating the reaction resin in a heating path to form a thermosetting core strand;
   inserting the core strand into an extruder head;
   applying thermoplastic melt in the extruder head to a cover layer on the core strand;
   cooling and calibrating the spring strip profile in a cooling and calibrating device;
   in a winding machine, forming at least one wrapped outer layer by wrapping the outer contour of the fiber bundle with at least one additional thread or filament fed laterally to the fiber bundle; and
   in the heating path, prior to insertion of the core strand into the extruder head, at least partially curing the reaction resin, at least in the wrapped outer layer of the fiber bundle;
   and wherein the throughput time of the core strand between a beginning of the thermal activation and an end of the cooling and calibration is shorter than a reaction time required for full curing across an entire cross-section of the core strand, and a throughput rate of the core strand is at least 4 meters/min.

2. The inline method as claimed in claim 1, wherein a free distance section is located in the fiber bundle between respective adjacent wrapped sections, the wrapped sections comprising the at least one additional thread or filament, and wherein the free distance section has a slightly smaller outer circumference compared to the wrapped sections.

3. The inline method as claimed in claim 1, wherein the outer contour of the core strand is circular.

4. The inline method as claimed in claim 1, wherein the outer contour of the core strand is polygonal.

5. The inline method as claimed in claim 1, wherein the fiber bundle impregnated with reaction resin is guided over a mandrel and a tubular core strand is formed.

6. The inline method as claimed in claim 5, wherein the mandrel is heated from the inside.

7. The inline method as claimed in claim 1, wherein a thermoplastic core is guided in an interior of the fiber bundle.

8. The inline method as claimed in claim 1, wherein the spring strip profile is cut to a spring strip bar at one end of the cooling and calibration device and during a storing time, which is greater than the throughput time, is stored free of bending forces for post-curing.

9. The inline method as claimed in claim 1, wherein a cross-winding is formed on the fiber bundle.

10. The inline method as claimed in claim 1, wherein after leaving the cooling and calibration device, the spring strip profile is cut to length and cut spring strips are stored on top of each other in stacks.

* * * * *